US00RE43250E

(19) United States
(12) Reissued Patent
Lloyd et al.

(10) Patent Number: US RE43,250 E
(45) Date of Reissued Patent: Mar. 20, 2012

(54) ARTICULATING DEVICE

(75) Inventors: Peter G. Lloyd, Malaga (ES); David S. Wallace, Nympsfield (GB); David R. McMurtry, Dursley (GB); James L. Chase, Wotton-under-Edge (GB); David Jones, Berkeley (GB)

(73) Assignee: Renishaw plc, Wotton-under-Edge (GB)

(21) Appl. No.: 12/662,143

(22) Filed: Mar. 31, 2010

Related U.S. Patent Documents

Reissue of:
(64) Patent No.: 7,350,310
Issued: Apr. 1, 2008
Appl. No.: 11/340,609
Filed: Jan. 27, 2006

(30) Foreign Application Priority Data

Jan. 27, 2005 (GB) ..... 0501690.2

(51) Int. Cl.
*G01B 5/20* (2006.01)
*G01B 5/00* (2006.01)

(52) U.S. Cl. ..... 33/559; 33/503; 33/556

(58) Field of Classification Search ..... 33/503, 33/505, 556–561, 1 M, 1 N
See application file for complete search history.

(56) References Cited

U.S. PATENT DOCUMENTS

| | | | | |
|---|---|---|---|---|
| 3,552,026 | A | | 1/1971 | Fedoroff |
| 3,636,635 | A | | 1/1972 | Lemelson |
| 3,750,295 | A | | 8/1973 | Normann et al. |
| 3,844,461 | A | | 10/1974 | Robison et al. |
| 4,168,576 | A | | 9/1979 | McMurtry |
| 4,313,263 | A | | 2/1982 | McMurtry |
| 4,495,700 | A | * | 1/1985 | Ernst ..... 33/1 N |
| 4,571,847 | A | | 2/1986 | McMurtry |
| 4,888,877 | A | * | 12/1989 | Enderle et al. ..... 33/559 |
| 5,189,806 | A | | 3/1993 | McMurtry et al. |
| 5,222,034 | A | | 6/1993 | Shelton et al. |
| 5,374,883 | A | | 12/1994 | Morser |

(Continued)

FOREIGN PATENT DOCUMENTS

CN 1070080 A 3/1993

(Continued)

OTHER PUBLICATIONS

Apr. 21, 2006 International Search Report issued in PCT/GB2006/000235.

(Continued)

*Primary Examiner* — Yaritza Guadalupe-McCall
(74) *Attorney, Agent, or Firm* — Oliff & Berridge, PLC

(57) ABSTRACT

Disclosed is a method of moving an articulating mechanism (22,410) for a measuring device, comprising the steps of: releasing two bodies (14,16, 410a,410b) which form the articulating mechanism allowing relative movement thereof; moving one of the bodies with respect to the other until a desired position is reached; and re-constraining the two bodies so they are relatively fixed, perhaps as part of a locking process, characterised in that relative movement prior to re-constraining at the desired position occurs under particular conditions. The particular conditions including moving from the same direction; and stopping, slowing down or maintaining the condition at a position adjacent to the desired position. Also disclosed is a method of positioning an articulating mechanism (22,410) for a measuring device which is controlled by a potentiometer and a controller (11) for a measuring device.

33 Claims, 5 Drawing Sheets

U.S. PATENT DOCUMENTS

| | | | | |
|---|---|---|---|---|
| 5,412,880 | A | 5/1995 | Raab | |
| 5,669,150 | A * | 9/1997 | Guertin et al. | 33/503 |
| 5,841,668 | A | 11/1998 | Pahk et al. | |
| 6,044,569 | A | 4/2000 | Ogihara et al. | |
| 6,546,643 | B2 | 4/2003 | Lotze et al. | |
| 6,604,295 | B2 | 8/2003 | Nishimura et al. | |
| 6,668,466 | B1 | 12/2003 | Bieg et al. | |
| 6,772,527 | B1 * | 8/2004 | Butter et al. | 33/503 |
| 6,817,108 | B2 * | 11/2004 | Eaton | 33/503 |
| 7,055,258 | B2 * | 6/2006 | Hajdukiewicz et al. | 33/559 |
| 7,100,297 | B2 | 9/2006 | McMurtry et al. | |
| 7,350,310 | B2 * | 4/2008 | Lloyd et al. | 33/559 |
| 7,578,069 | B2 * | 8/2009 | Eaton | 33/503 |
| 7,614,157 | B2 * | 11/2009 | Granger | 33/503 |
| 2005/0151963 | A1 | 7/2005 | Pulla et al. | |
| 2006/0130349 | A1 * | 6/2006 | Jordil et al. | 33/559 |
| 2009/0025244 | A1 * | 1/2009 | Jonas et al. | 33/559 |
| 2009/0139105 | A1 * | 6/2009 | Granger | 33/503 |
| 2009/0177438 | A1 * | 7/2009 | Raab | 702/152 |
| 2009/0249634 | A1 * | 10/2009 | Pettersson | 33/503 |
| 2009/0255139 | A1 * | 10/2009 | Wallace et al. | 33/503 |
| 2010/0095542 | A1 * | 4/2010 | Ferrari | 33/503 |

FOREIGN PATENT DOCUMENTS

| | | | |
|---|---|---|---|
| CN | 1430118 | A | 7/2003 |
| DE | 10 85 230 | | 7/1960 |
| DE | 10 85 230 | B | 7/1960 |
| EP | 0 431 183 | A1 | 6/1991 |
| EP | 0 590 384 | | 4/1994 |
| EP | 0 590 384 | A | 4/1994 |
| EP | 0 590 384 | B1 | 12/1997 |
| GB | 935245 | | 10/1959 |
| JP | A-63-285610 | | 11/1988 |
| JP | A-02-284216 | | 11/1990 |
| JP | A-05-248801 | | 9/1993 |
| JP | A-2004-521347 | | 7/2004 |
| WO | 0 389 108 | A2 | 9/1990 |
| WO | WO 93/02552 | | 2/1993 |
| WO | WO 02/101329 | A1 | 12/2002 |
| WO | WO 2004/003466 | A2 | 1/2004 |

OTHER PUBLICATIONS

Jan. 25, 2006 PCT Written Opinion of the International Search Authority (Corrected Version) issued in International Application No. PCT/GB2006/000235.

European Patent Office, Official Action mailed Apr. 4, 2008 in European Patent Application No. 06 703 199.7-1239.

First Chinese Office Action, Chinese Patent Application No. 200680002783.0 with Statement of Relevance.

Second Chinese Office Action, Chinese Patent Application No. 200680002783.0 with Translation.

Third Chinese Office Action, Chinese Patent Application No. 200680002783.0 with Translation.

Fourth Chinese Office Action, Chinese Patent Application No. 200680002783.0 with Translation.

Japanese Patent Office, Official Notice of Rejection mailed Sep. 13, 2011 in Japanese Patent Application No. 2007-552709 w/English-language Translation.

Mar. 3, 3011 European Search Report issued in EP 10 00 4149.

* cited by examiner

ARTICULATING DEVICE

Matter enclosed in heavy brackets [ ] appears in the original patent but forms no part of this reissue specification; matter printed in italics indicates the additions made by reissue.

This invention relates to an articulating device and method of moving such which enables the relative positioning of two relatively moveable bodies in one of a plurality of defined, or indexed, positions.

A known type of articulating mechanism comprises two sets of detent elements, which are mutually engageable in a plurality of indexed, repeatable relative positions. One such mechanism is described in U.S. Pat. No. 4,168,576 which includes a circular array of hemispherical detent elements on one body and three elongate cylindrical detent elements on a relatively rotatable body. At each indexed position, each of the cylindrical elements engages the mutually convergent surfaces of an adjacent pair of hemispherical elements. The number of indexed positions provided by such a mechanism corresponds to the number of sets of convergent surfaces in the circular array.

When a movement to a different indexed position is required, the elements are disengaged, the bodies relatively moved and the elements re-engaged. The exact locations of the two bodies when they re-engage is affected by the motion that has been undertaken. This can be mitigated, in the case of motorised articulating mechanisms, by using a relatively precise, backlash free servo mechanism but this is expensive.

In a further type of articulating mechanism, there are no indexed positions and the two relatively moveable bodies can locate at any relative position. A potentiometer or encoder is used to indicate the relative positions of the two bodies. Again, the exact locations of the two bodies when they come to rest is affected by the motion that has been undertaken.

The present invention provides a method of moving an articulating mechanism for a measuring device, comprising the steps of:

- releasing two bodies which form the articulating mechanism allowing relative movement thereof;
- moving one of the bodies with respect to the other until a desired position is reached; and
- re-constraining the two bodies so they, are relatively fixed, characterised in that relative movement prior to re-constraining at the desired position occurs under particular conditions.

The particular conditions includes setting constraints on the movement for example, that the movement is always from the same direction. Limiting the movement to coming from one direction means that any positioning error due to overshoot or backlash as a result of the movement will be congruous thus reducing any errors in the positioning of the probe. The particular conditions also includes constraining the movement such that certain criteria are always met such as the speed of the movement being a certain value. The criteria or constraints can be that one or more of the movement conditions are fixed or that the same movement conditions are used for the particular conditions.

Preferably, the particular conditions includes controlling the movement at a position adjacent the desired position. In one embodiment, the bodies are moved to the desired position and then removed to an adjacent position and back to the desired position Preferably, relative movement prior to re-constraining at the desired position is as part of a lock up or re-constraining procedure.

In a preferred embodiment, the step of:

- releasing the two bodies comprises disengaging co-operating surfaces of two bodies which form the articulating mechanism; and
- re-constraining the two bodies comprises re-engaging the co-operating surfaces of, the two bodies so they are relatively fixed.

In a second aspect the invention provides a method of moving an articulating mechanism for a measuring device comprising the steps of:

(a) releasing two bodies which form the articulating mechanism allowing relative movement thereof;

(b) moving one of the two bodies with respect to the other until a position adjacent ac desired position is reached;

(c) moving one of the two bodies with respect to the other from the position adjacent to the desired position to the desired position whereby said movement occurs under particular conditions; and (d) re-constraining the two bodies so they are relatively fixed.

Controlling the motion at an adjacent position by carrying out said movement under particular conditions means that any change in positional error which results from the motion having different speed, and higher derivatives such as acceleration, are mitigated. The particular conditions may include stopping the motion i.e. introducing a pause. However, instead of stopping, it may be preferred that the motion is slowed down or maintained at a consistently used speed as this provides a smoother transition. The adjacent position need not be the immediate neighbouring position but should always be the same distance from the desired position in order to reap the most benefit from the invention.

In a further embodiment, prior to step (b), the two bodies are moved relative to one another until the desired position is reached.

Preferably, the step of:

- releasing the two bodies comprises disengaging co-operating surfaces of two bodies which form the articulating mechanism; and
- re-constraining the two bodies comprises re-engaging the co-operating surfaces of the two bodies so they are relatively fixed.

According to a third aspect, the invention provides a method of positioning an articulating mechanism for a measuring device which is controlled by a potentiometer comprising:

- moving the articulating mechanism to a position under particular conditions;
- recording a signal indicative of that position; and repeating for other positions; characterised in that, during a subsequent movement to the position carried out under the same particular conditions, a signal indicative of the position is obtained, compared with the recorded signal and the articulating mechanism is moved until the indicative signal corresponds to the recorded signal.

Preferably, the particular conditions, includes approaching the new position from the same direction.

According to a fourth aspect, the invention provides a controller for a measuring device comprising:

- a comparator for comparing current device position with a desired position; and
- means to control motion of the device such that it always moves to the desired position under particular conditions.

Preferably, the particular conditions includes that the movement is always from the same direction.

The invention extends to a measuring device including a controller.

According to a fifth aspect, the invention provides a measuring device comprising:

an articulating mechanism having two; bodies with co-operating surfaces; and a controller which includes a comparator for comparing current device position with a desired position, characterised in that the comparator is instructed to allow the articulating mechanism to move to the desired position under particular conditions.

Preferably, particular conditions includes that the arrival is from a certain direction.

Preferably, the measuring device is a probe. The invention also extends to a measuring machine comprising such a measuring device.

The invention will now be described by example with reference to the accompanying drawings, of which:

Figure 1:
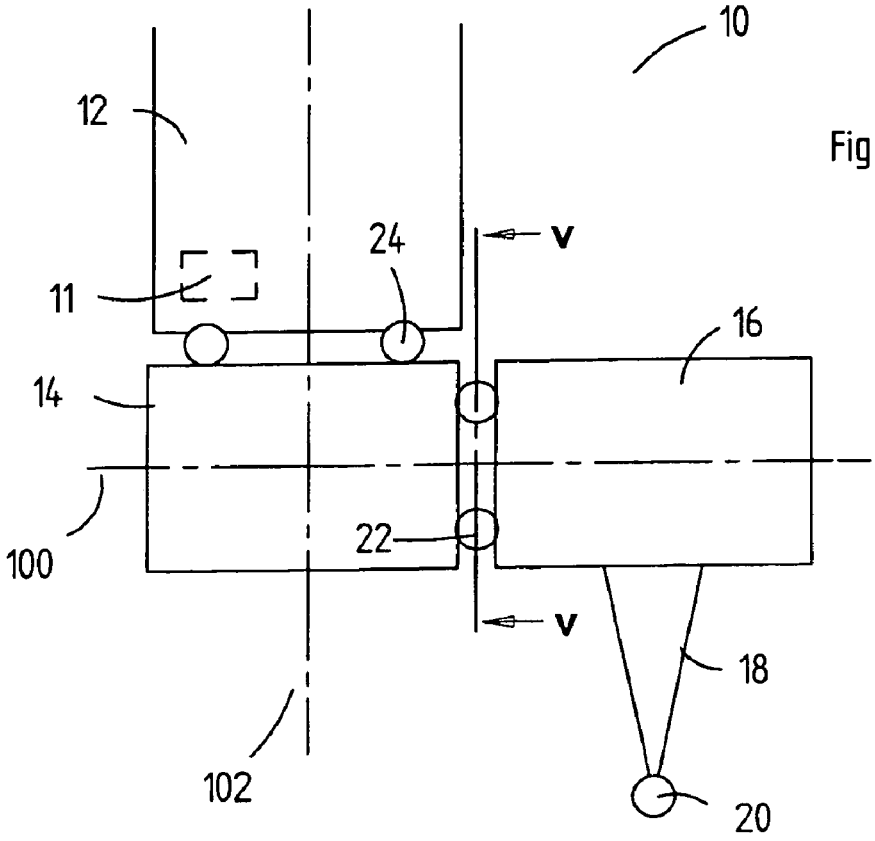
FIG. 1 shows schematically a touch probe according to the invention.

FIG. 1 shows an articulating device, in this case a touch probe 10 comprising a probe head 12 which is attached at one end via a quill, column or other connecting device (not shown) to a co-ordinate measuring machine, position measuring machine, robot, or other relatively fixed structure. At its distal end, the probe head 12 is connected via a pivot mounting 14 to an indexable probe 16. The probe 16 is additionally connected to a styles 18 having a probing tip 20 which contacts a surface to be examined.

The indexable probe 16 connects to the pivot mounting 14 via an articulating mechanism, in this case a kinematic location 22 which enables the probe 16 to be rotated about a horizontal axis 100. The pivot mounting 14 also connects to the probe head 12 via a kinematic location 24 which enables rotation about vertical axis 102. Thus, in this example the probe is rotatable about two axes at the same time.

Figure 2:
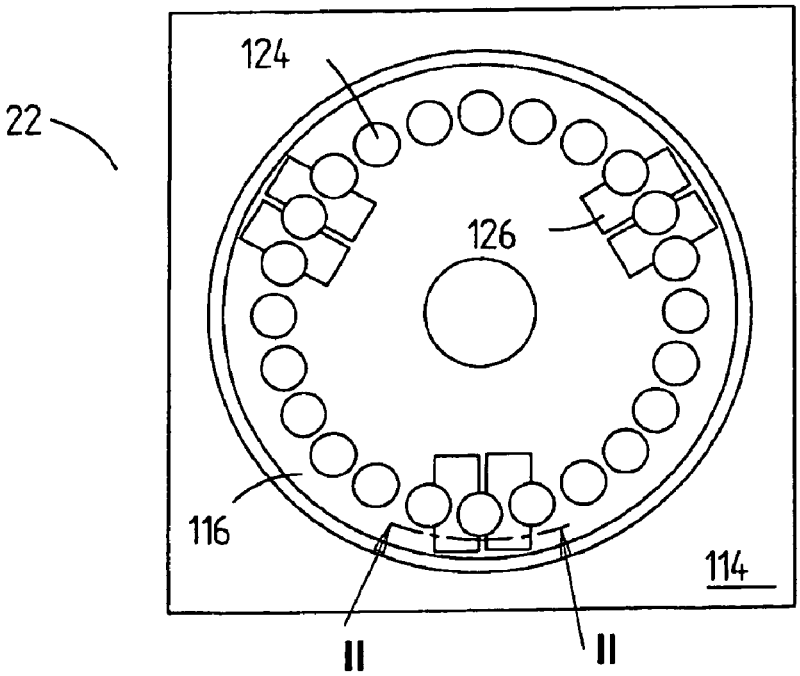
FIG. 2 is a section on the line V-V in FIG. 1.
Figure 3:
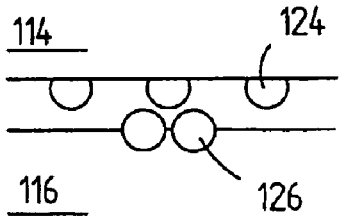
FIG. 3 is a section on the line II-II in FIG. 2.

Referring now to FIGS. 2 and 3, the kinematic location 22 includes an annular array of spherical supports 124 located on a member 114 which forms part of the pivot joint 14. Located on the mating face 116 of the probe 16 are three pairs of cylinders 126 which are spaced equally around the horizontal axis 100. The spherical supports 124 and cylinders 126 are two sets of mutually engageable detent elements. The annular array of spherical supports 124 and cylinders 126 are biased into engagement by, for example, a spring (not shown). A similar arrangement can be used for the kinematic location 24.

FIGS. 4a to 4d and 5a to 5d illustrate the problem which is mitigated by the invention: FIG. 4 shows an articulating mechanism which comprises a first body 114 having an array of spherical supports 124 which engage with three pairs of cylinders 126 located on a second body 116. FIG. 5 shows an alternative arrangement where a first body 214 includes one set of gear teeth 224 which engage with a second set of gear teeth 226 located on a second body 216. The amount of misalignment shown if FIGS. 4 and 5 has been exaggerated in order to more clearly illustrate the misalignment.

Figure 4A:
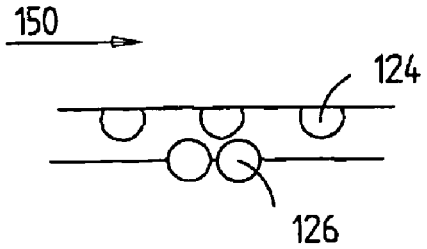
FIGS. 4a to 4d illustrate positioning error of an articulating mechanism.
Figure 5A:
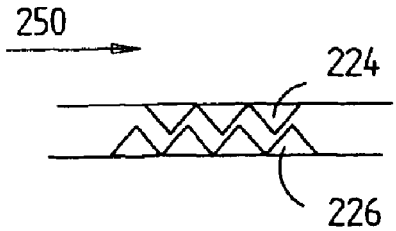
FIGS. 5a to 5d illustrate positioning error of an alternative articulating mechanism.

In FIGS. 4a and 5a, a relative movement 150,250 of the first 114,214 body with respect to the second 116,216 body has occurred. When the two bodies 114,116 and 214,216 are subsequently engaged or re-constrained (FIGS. 4b,5b) locking the articulating mechanism, the cylinders 126 and gear teeth 226 do not sit centrally (as shown by line 200) in the mutually convergent surfaces of the balls 124 and teeth 224 that they are engaged with.

Figure 4C:
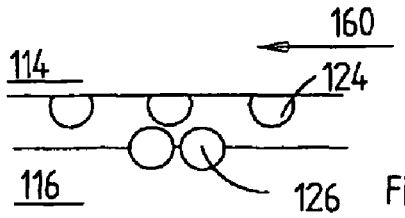
Figure 4B:
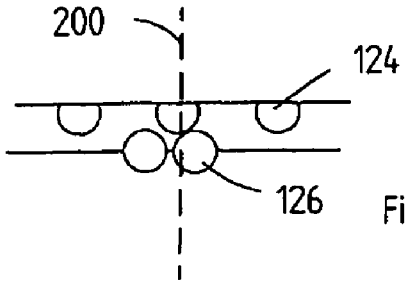
Figure 4D:
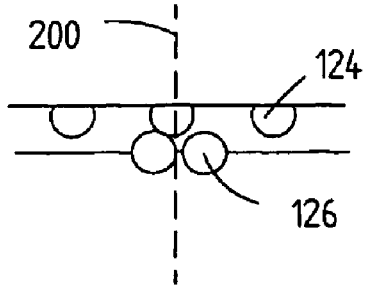
Figure 5C:
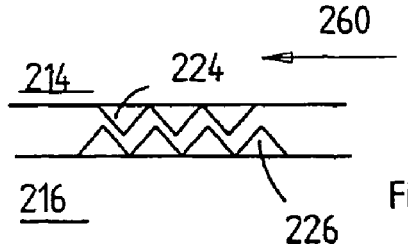
Figure 5B:
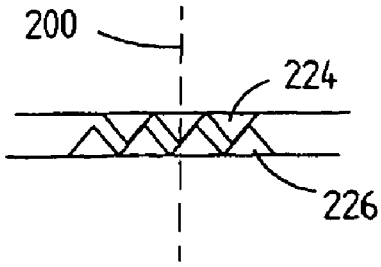
Figure 5D:
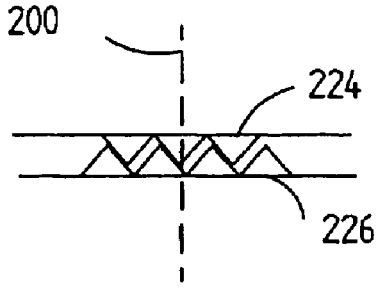

In FIGS. 4c and 5c, a relative movement 160,260 of the first 114,214 body with respect to the second 116,216 body has occurred in the opposite direction to that previously described. When the two bodies 114,116 and 214,216 are subsequently engaged or re-constrained (FIGS. 4d,5d) locking the articulating mechanism, the cylinders 126 and gear teeth 226 again do not sit centrally (as shown by line 200) it the mutually convergent surfaces of the balls 124 and teeth 224 that they are engaged with.

A further example of an articulating mechanism comprises a belt which includes a plurality of teeth on one of the bodies.

The difference in position between the resultant locked or re-constrained locations of the articulating mechanism when moved in opposite directions produces an error from the true desired position which may be around double the error than when only one direction is used. Thus by only approaching a desired position from a certain direction positional error is reduced.

A further advantage of the invention is that because the desired position is approached from the same direction the position in which the articulating mechanism is locked can be designated as the actual position.

Figure 6:
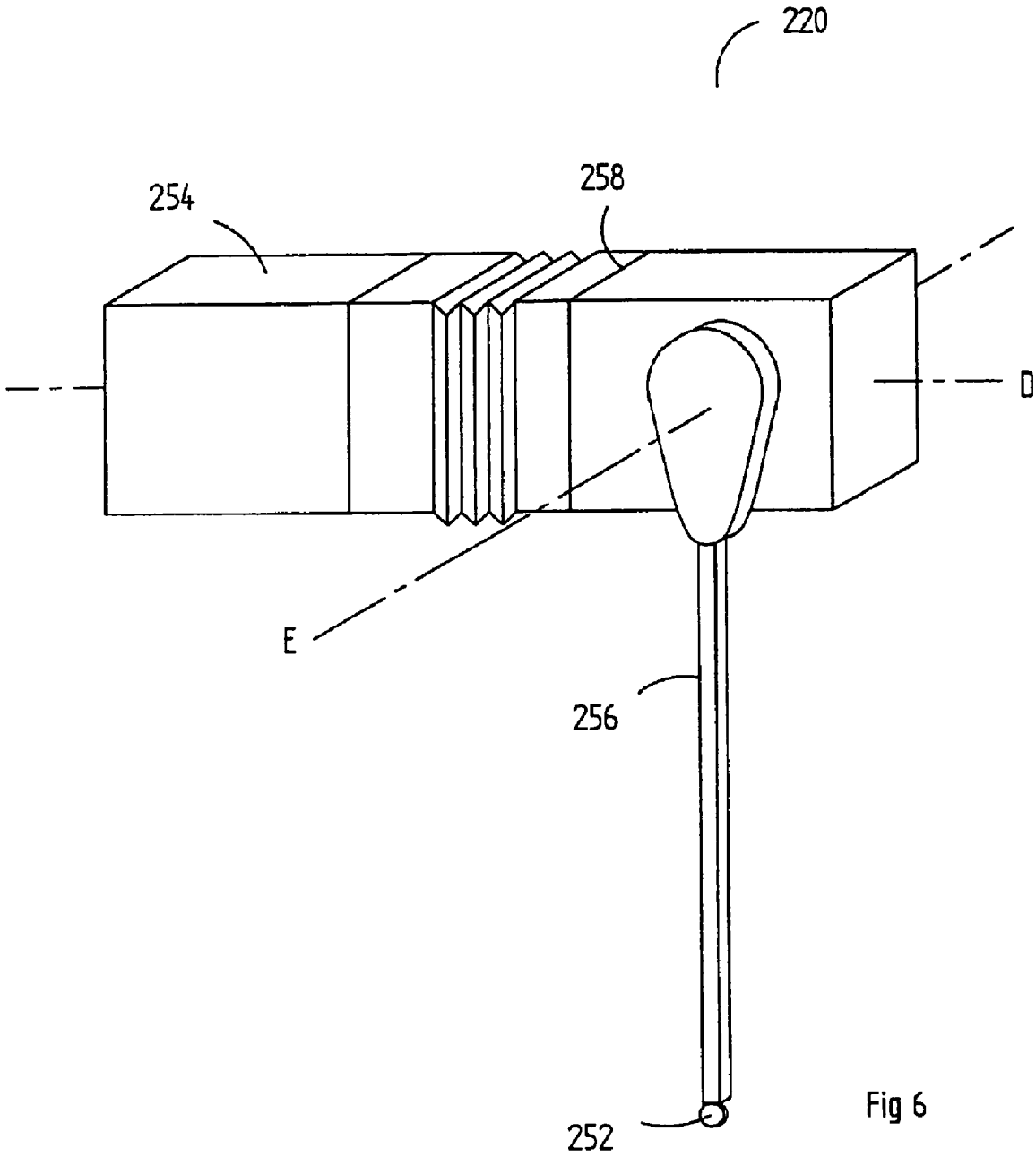
FIG. 6 is a perspective of an alternative touch probe according to the invention.

FIG. 6 shows an alternative touch probe 220 having a probing tip 252 which is connected to a quill 254 via an elongate arm 256. To enable movement of the probe tip 252 with respect to the quill 254, the elongate arm 256 is attached to the quill via two rotatable members or articulating mechanisms (not shown) which enable rotary movement about axes D and E respectively. In this example, the touch probe is not an indexable probe, and so can be moved to any angular location rather than a multitude of defined positions.

When the probe tip 252 is moved with respect to the quill 254, the elongate arm 256 will bend. To mitigate any errors that would be introduced by such bending, a consistent acceleration is used when the probe tip approaches the new position. Additionally, it is preferred that the new position is approached from the same direction each time a movement is effected.

To protect the equipment from damage, the touch probe is provided with a breakout connection 258. In the event that any part of the probe, contacts a surface with more force than is acceptable i.e. a crash occurs, the breakout connection preferentially breaks before any fragile or expensive components are damaged. The use of such a breakout connection can be a source of error in the positioning of the probe tip, especially when high speed movement is used as such movement can cause the probe arm to bend and this is transferred back to the breakout connection. For this reason as well, consistent acceleration or constant velocity is used when moving to a new position.

Two ways in which the position of the articulating mechanism of FIG. 6 is controlled is by a potentiometer or an encoder. In the case of potentiometers, the index position or location is indicated by the value of a voltage signal. In probe systems, this signal typically changes by 22 mV per degree. In the case of encoders a position count is used.

Potentiometers have a tendency to drift over time so the voltage signal which is associated with a particular index location or position will change. Also, as potentiometers do not vary linearly, a range of voltage values is given for each location. This can result in movement of the articulating mechanism to the wrong location. The invention provides a method of identifying this drift and a method of positioning the articulating mechanism so that rather than giving each location a range for the voltage signal, an exact value can be assigned. To enable this, for each articulating mechanism, each position must be approached in the same manner according to the first aspect of the invention i.e. under particular conditions, for example, from the same direction and preferably the same distance. This will give an absolute voltage reading for each position when locked which is recorded in a table and used either manually or electronically each time the articulating mechanism is moved to a new position. This table may be updated every time you look into a position. Alternatively, on a subsequent movement under the same conditions to a position, a signal or reading is obtained, and if there is a difference between that reading and the recorded reading, the articulating mechanism is moved until that reading corresponds to the recorded reading.

Any difference between the recorded or tabular reading and the present or indicative reading may be flagged. Preferably, the difference is flagged only when the difference between tabular reading and actual reading reaches a certain amount or value i.e. when drift of the potentiometer has reached an-unacceptable amount.

In the event that the articulating mechanism is moved to a location which is between recorded positions, the recorded position is interpolated. The recorded positions may be 1° or 5° apart for example. Obviously, if the conditions of the movement are changed, a new table is required.

If the voltage signal received when the articulating mechanism is locked does not tally with the expected result then this can be flagged to an operator and the equipment tested.

In the case of an encoder, a similar method is used. Each position of the articulating mechanism is visited under the same particular conditions and an exact position count recorded. These position counts are subsequently used when moving back to this position some time later.

Figure 7:
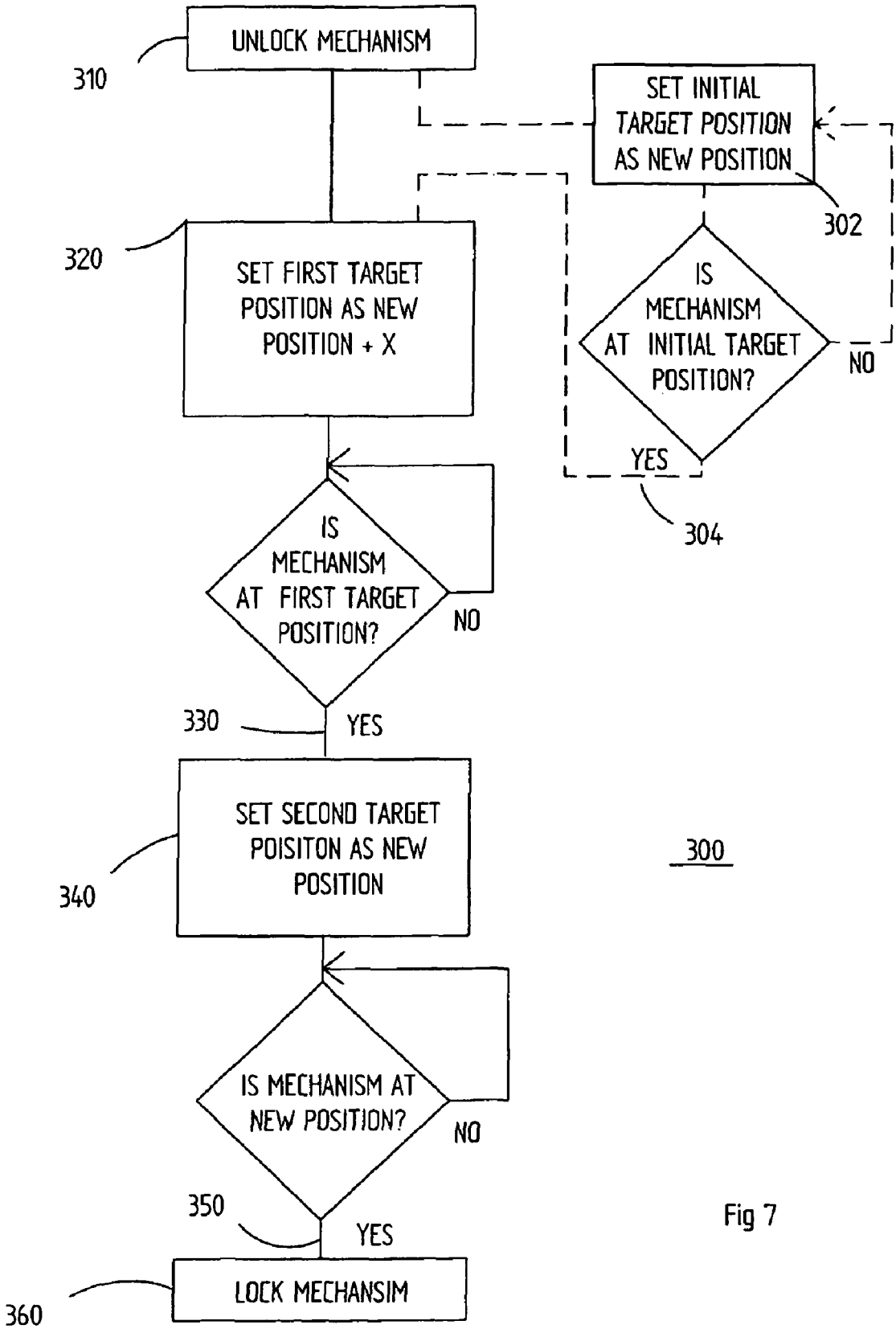
FIG. 7 shows a flow diagram detailing steps carried out according to the invention.

FIG. 7 is a flow diagram 300 showing the steps that are carried out when an articulating mechanism is moved to a new position. Firstly the articulating mechanism is unlocked or released 310. A first target position 320 is set as the new position plus a value X and the articulating mechanism moved towards this first target position. When the mechanism has reached the first target position 330, the target position is changed and set as the new position 340. The movement to the new position occurs under particular conditions. When the mechanism reaches the new position 350 (or second target position), the articulating mechanism is locked, re-constrained or engaged in that position 360.

The value of X is selected as a nominal amount, for example 3° or 66 mV depending on the technique used to establish location.

A controller controls the movement of the articulating mechanism and one way to establish whether a target position has been reached is to use a comparator which compares the current position of the articulating mechanism with the target position. When there is no difference, the motion is stopped or paused.

In the case of probes, the different positions of the articulating mechanism are typically assigned an angular value. In this situation, X will be of constant value regardless of whether the probe is initially moved in a clockwise or anti-clockwise direction.

In other situations, the movement of the articulating mechanism may be to move a certain number of degrees. In this case, if the direction from which the articulating mechanism moves to the new position is set as clockwise, then when there is less than, 180° of a circle to travel to reach the new position, X will have a negative value so the mechanism pauses before it reaches the new position. If there is more than 180° of the mechanism to traverse to reach the new position then either one clockwise movement can be made having X as negative or, a shorter anti-clockwise manoeuvre can be made. However, in this circumstance X is positive thus, the mechanism will move passed the new position and return to it moving in the clockwise direction.

In the case where the articulating mechanism is used to move a probe, the controller (FIG. 1, 11) which controls the movement may he located in the probe or in a separate controller unit.

In this example, use of the invention is described with respect to one axis only. In reality, and for the examples describes with respect to FIGS. 1 and 6, the invention is carried out in two axes simultaneously.

In a further embodiment, the invention pan be carried out as part of the lock up or engagement procedure for the articulating device. In this embodiment, the articulating device is moved to the new or desired position and then, during the locking process, prior to the re-engagement of the device, a relative movement between the two parts of the device to an adjacent position and back to the new position occurs. Thus, after unlocking the mechanism 310, an initial target position is set as the new position 302 and the articulating mechanism is moved towards this initial target position. When the mechanism has reached the initial target position 302, the target position is changed 304 and set as the first target position 320 which is the new position plus a value X. The procedure then continues as described above.

Figure 8:
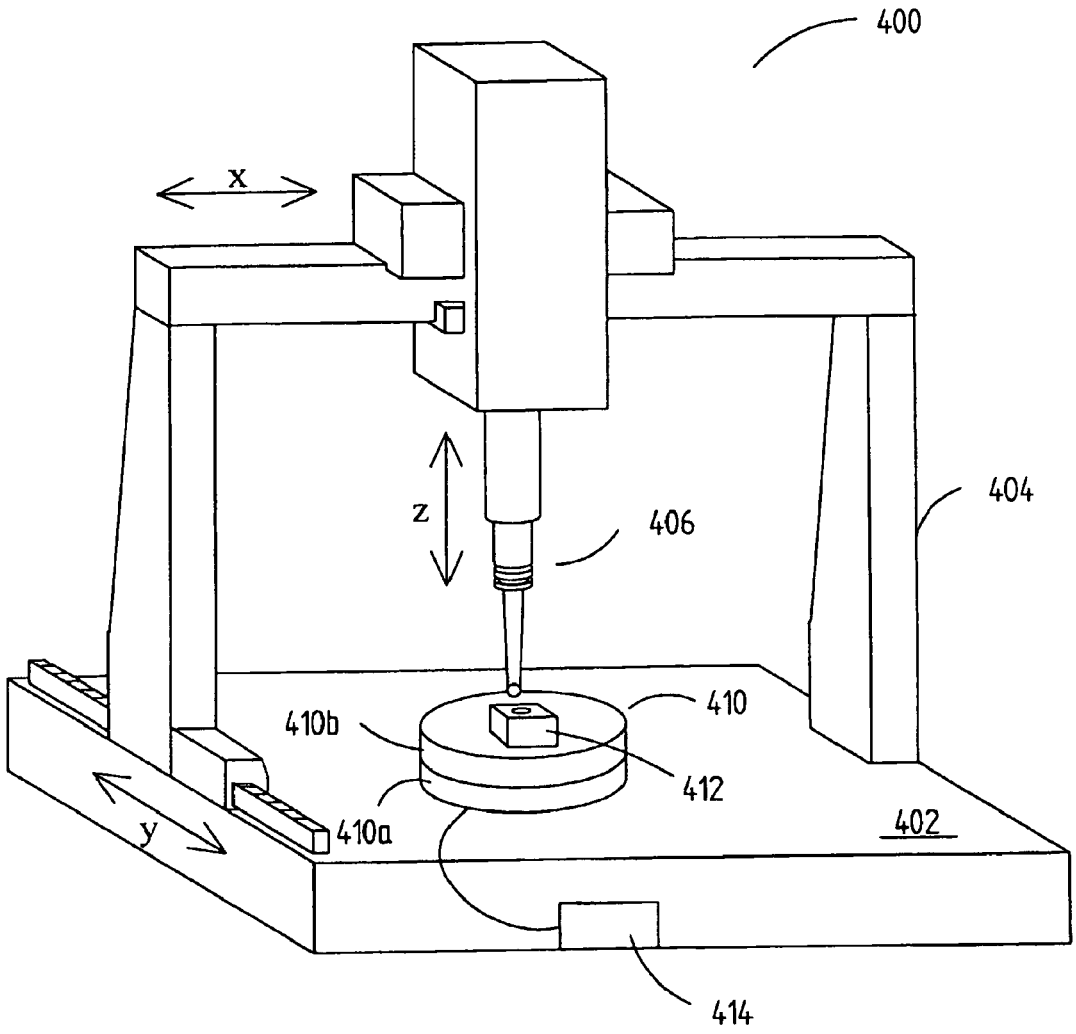
FIG. 8 shows a coordinate measuring, machine including a device according to the invention.

FIG. 8 shows a coordinate measuring machine (CMM) 400 including a base 402 onto which a sample may be placed and a gantry 404 which, supports a measuring probe 406 and enables movement of the probe with respect to the base in x, y and z directions.

The CMM 400 is provided with a rotary table 410 which sits on the base 402. The rotary table 410 is an articulating mechanism which has two parts 410a,410b which when disengaged (not shown) are relatively rotatable, using power from motor 414, enabling rotation of a sample 412 placed thereon with respect to the probe 406. The rotary table 410 is, for example, a Hirth coupling comprising interlocking gear teeth.

Throughout this specification, a measuring device includes machines such as coordinate measuring machines, machine tools, lathes, measuring machines, manual coordinate measuring aims, non-Cartesian mechanisms and other parallel kinematic-machines (such as tripods and hexapods), robots, for example work inspection robots, and single axis machines.

The invention claimed is:

1. A method of moving an articulating mechanism for a measuring device, comprising the steps of:

releasing two bodies which form the articulating mechanism allowing relative movement thereof;

moving one of the bodies with respect to the other until a desired position is reached wherein the relative movement occurs under particular conditions; and re-constraining the two bodies so they are relatively fixed, characterized in that the relative movement prior to re-constraining at the desired position is a part of a locking process.

2. A method according to claim 1, wherein the particular conditions includes moving from particular direction.

3. A method according to claim 1 wherein, the particular conditions includes controlling the movement at a position adjacent to the desired position.

4. A method according to claim 1 wherein, the particular conditions includes stopping, slowing down or maintaining at a consistently used speed at a position adjacent the desired position.

5. A method according to claim 1 wherein, the step of:

releasing the two bodies comprises disengaging co-operating surfaces of two bodies which form the articulating mechanism; and re-constraining the two bodies comprises re-engaging the co-operating surfaces of the two bodies so they are relatively fixed.

6. A method of moving an articulating mechanism for a measuring device, the method comprising:

(a) releasing two bodies which form the articulating mechanism allowing relative movement thereof;

(b) moving one of the two bodies with respect to the other until a position adjacent a desired position is reached;

(c) moving one of the two bodies with respect to the other from the position adjacent to the desired position to the desired position whereby said movement occurs under particular conditions; and (d) re-constraining the two bodies so they are relatively fixed characterized in that the relative movement prior to re-constraining at the desired position is a part of a locking process.

7. A method according to claim 6 wherein, between steps (a) and (b) is the additional step of moving one of the two bodies with respect to the other until the desired position is reached.

8. A method according to claim 6 wherein, the step of:

releasing the two bodies comprises disengaging co-operating surfaces of two bodies which form the articulating mechanism; and re-constraining the two bodies comprises re-engaging the co-operating surfaces of the two bodies so they are relatively fixed.

9. A method of positioning an articulating mechanism for a measuring device which is controlled by a potentiometer, the method comprising:

moving the articulating mechanism to a position under particular conditions;

recording a signal indicative of that position; and repeating for other positions; characterized in that, during a subsequent movement to the position carried out under the same particular conditions, a signal indicative of the position is obtained, compared with the recorded signal and the articulating mechanism is moved until the indicative signal corresponds to the recorded signal.

10. A method according to claim 9, wherein the particular conditions includes approaching the position from particular direction.

11. A method according to claim 9, wherein any difference between the recorded and indicative signal is flagged.

12. A method according to claim 9 wherein, if the articulating mechanism is moved to a location which is between positions, the recorded signal is interpolated.

13. A method according to claim 9, wherein the articulating mechanism is locked when the indicative signal corresponds to the recorded signal.

14. A measuring device comprising:

an articulating mechanism having two bodies which can be relatively fixed or relatively moveable;

a controller which includes a comparator for comparing current device position with a desired position; and means to control motion of the device such that it always moves to the desired position under particular conditions as part of a locking procedure to re-constrain the two bodies so they are relatively fixed.

15. A probe comprising a measuring device according to claim 14.

16. A measuring machine comprising a measuring device according to claim 14.

*17. A method of positioning an articulating mechanism for a measuring device comprising two bodies which are relatively movable and lockable in each of a plurality of defined positions, a reading being provided which is indicative of the relative position of the two bodies, the method comprising:*

*(a) unlocking the two bodies;*

*(b) comparing a current reading indicative of relative position of the two bodies with a recorded reading thereof and moving the two bodies until the current reading corresponds to the recorded reading, the recorded reading having been recorded when the two bodies of the articulating device were locked; and*

*(c) locking the two bodies.*

*18. A method according to claim 17, wherein recorded readings for the plurality of defined positions are recorded in a table.*

*19. A method according to claim 17, including recording the readings when the bodies are locked in the plurality of defined positions.*

*20. A method according to claim 17, wherein the articulating mechanism comprises two sets of detent elements, one set on each body, the detent elements being mutually engaged when the bodies are locked in the defined positions, and being released when the bodies are unlocked.*

*21. An articulating mechanism for a measuring device comprising:*

*two relatively movable bodies which can be locked and unlocked in a plurality of defined positions; and*

*a controller configured to:*

*access recorded readings indicative of the relative position of the two bodies when the bodies are locked in each of the plurality of defined positions;*

*compare a current position reading for the two relatively movable bodies with an accessed recorded reading; and*

*control movement of the two relatively movable bodies, the movement of the bodies being stopped and locked when there is no difference between the current position and the accessed recorded reading.*

*22. An articulating mechanism according to claim 21, wherein the readings indicative of the relative position of the two bodies when the bodies are locked are recorded in a table.*

*23. An articulating mechanism according to claim 21, wherein the articulating mechanism comprises two sets of detent elements, one set on each body, the detent elements being mutually engaged when the bodies are locked in the defined positions, and being released when the bodies are unlocked.*

*24. A measuring machine including an articulating mechanism for a measuring device, wherein:*

*the articulating mechanism comprises two relatively movable bodies which can be locked and unlocked in a plurality of defined positions; and*

*the measuring machine comprises a controller configured to:*

*access recorded readings indicative of the relative position of the two bodies when the bodies are locked in each of the plurality of defined positions;*

*compare a current position reading for the two relatively movable bodies with an accessed recorded reading; and*

*control movement of the two relatively movable bodies, the movement of the bodies being stopped and locked when there is no difference between the current position and the accessed recorded reading.*

*25. A measuring machine according to claim 24, wherein the readings indicative of the relative position of the two bodies when the bodies are locked are recorded in a table.*

*26. A measuring machine according to claim 24, wherein the articulating mechanism comprises two sets of detent elements, one set on each body, the detent elements being mutually engaged when the bodies are locked in the defined positions, and being released when the bodies are unlocked.*

*27. A method of positioning an articulating mechanism for a measuring device, the articulating mechanism comprising first and second bodies, the second body being movable relative to the first body; and two sets of detent elements, one set on each body; the detent elements being mutually engageable in a plurality of defined positions of the second body relative to the first body; the detent elements being releasable so that the second body can be moved relative to the first body and re-engageable so that the bodies are relatively fixed in a new one of the defined positions, the positioning method comprising:*

*(a) moving the articulating mechanism to one of the positions and engaging the detent elements;*

*(b) recording a signal indicative of the position at which the detent elements were engaged in (a); and*

*(c) repeating (a) and (b) for other ones of the positions;*

*(d) during a subsequent movement to one of the positions:*

*obtaining a signal indicative of that position;*

*comparing the obtained signal with a corresponding recorded signal;*

*moving the articulating mechanism until the indicative signal corresponds to the recorded signal; and*

*re-engaging the elements when the indicative signal corresponds to the recorded signal.*

*28. A method according to claim 27 wherein the one of the positions is approached from the same direction during the subsequent movement as in (a).*

*29. A method according to claim 27 further comprising flagging when the signal received when the detent elements of the articulating mechanism are re-engaged does not tally with an expected result.*

*30. A method according to claim 27 wherein, if the articulating mechanism is moved to a location which is between positions, the recorded signal is interpolated.*

*31. A method according to claim 27 wherein, in (b), the signals indicative of the positions are recorded in a table.*

*32. A method according to claim 27 wherein (b) is performed while the detent elements are engaged in the position.*

*33. A measuring device, comprising:*

*an articulating mechanism comprising:*

*first and second bodies, the second body being movable relative to the first body; and*

*two sets of detent elements, one set on each body, the detent elements being mutually engageable in a plurality of defined positions of the second body relative to the first body, the detent elements being releasable so that the second body can be moved relative to the first body and re-engageable so that the bodies are relatively fixed in a new one of the defined positions; and*

*a controller which includes a comparator for comparing the current relative position of the movable bodies with a recorded signal indicative of a desired position, the controller being configured to:*

*(a) move the articulating mechanism to one of the positions and engage the detent elements;*

*(b) record a signal indicative of the position at which the detent elements were engaged in (a); and*

*(c) repeat (a) and (b) for other ones of the positions; and*

*(d) during a subsequent movement to one of the positions:*

*compare a signal indicative of that position with a corresponding recorded signal;*

*move the articulating mechanism until the indicative signal corresponds to the recorded signal; and*

*re-engage the elements when the indicative signal corresponds to the recorded signal.*

* * * * *